United States Patent [19]

Guarnaschelli

[11] 4,261,333
[45] Apr. 14, 1981

[54] SOLAR HEAT EXCHANGER

[76] Inventor: Stephen Guarnaschelli, 4608 Wayfarer Pl., Orlando, Fla. 32807

[21] Appl. No.: 99,534

[22] Filed: Dec. 3, 1979

[51] Int. Cl.³ .............................................. F24J 3/02
[52] U.S. Cl. .................................. 126/427; 126/422; 126/448; 126/449; 219/305; 219/279
[58] Field of Search ............... 126/417, 432, 443, 444, 126/445, 446, 448, 449, 450, 427; 165/156, 168; 219/305–308, 381, 279

[56] References Cited

U.S. PATENT DOCUMENTS

| 1,056,861 | 3/1913 | Walker | 126/446 |
| 1,990,738 | 2/1935 | La Porte | 165/156 |
| 2,023,417 | 12/1935 | Guarnaschelli | 72/115 |
| 2,037,378 | 4/1936 | Guarnaschelli | 72/115 |
| 3,831,672 | 8/1974 | Battisti | 165/156 |
| 3,898,428 | 8/1975 | Dye | 165/156 |
| 3,954,097 | 5/1976 | Wilson, Jr. | 126/438 |
| 3,983,861 | 10/1976 | Beauchaine | 126/442 |
| 3,999,389 | 12/1976 | Bryce | 126/438 |
| 4,074,706 | 2/1978 | Hajdu | 126/447 |

Primary Examiner—James C. Yeung
Attorney, Agent, or Firm—Duckworth, Hobby, Allen, Dyer & Pettis

[57] ABSTRACT

A solar heating panel apparatus has a supporting base with a plurality of elongated heat exchanger members mounted to the base. Each heat exchanger is operatively connected to one end of an adjacent heat exchanger to provide a continuous path through the heat exchangers from a fluid input to a fluid output. Each heat exchanger has a hollow center core having a passageway running spirally around the center core and uses the center core as one wall of the spiralling passageway. The fluid flows through the spiralling passageway, and may flow through the center core, although the center core may also be used to enclose heating elements so that the solar panel can be used without benefit of a conventional hot water heater.

5 Claims, 4 Drawing Figures

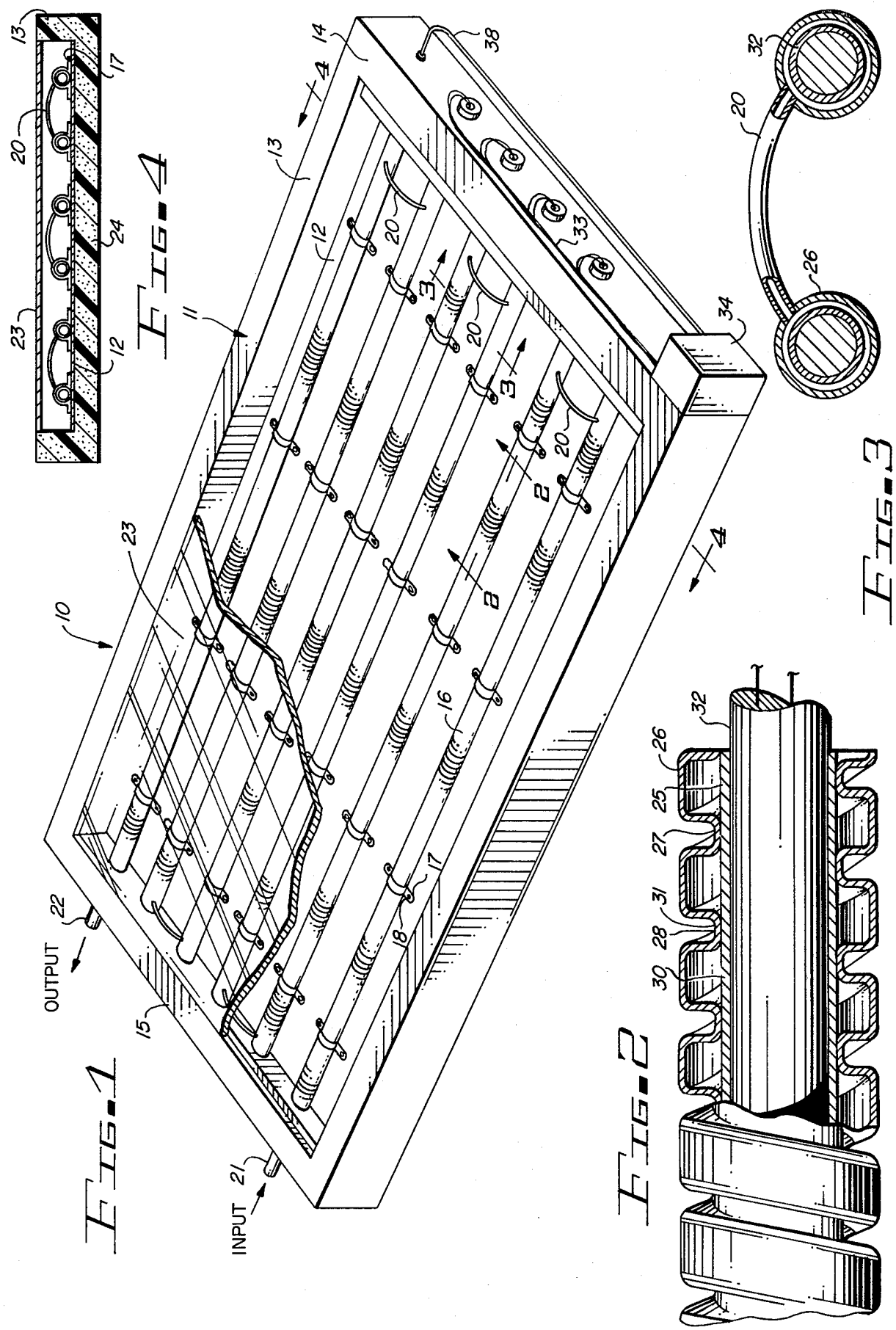

SOLAR HEAT EXCHANGER

BACKGROUND OF THE INVENTION

The present invention relates to heat exchangers and especially to a solar heating panel using an improved heat exchanger.

In the past, a wide variety of solar heaters and solar panels have been provided for heating hot water and also for heating buildings. A typical solar heater provides a base panel having short sides and a serpentine passageway of pipes passing therethrough. The panel may be covered with glass to prevent the escape of the heated inside of the panel and may have the base coated black for capturing the heat energy from the sun rays within the glass enclosed panel. Pipes passing through the panel are typically made of copper to absorb the heat in the panel, but a variety of other materials and techniques have also been suggested. The tubing used in solar heaters usually has a smooth straight flow path so that the liquid passes through the tubing too fast to obtain the maximum benefit from the solar heat. The solar heating panel is connected to an electric water heater where the solar heated water can be mixed with electrically heated water as needed to obtain sufficient hot water.

The present invention relates to a solar panel of this type having an improved heat exchanger replacing the serpentine passageway of pipes through the panel for an improved efficiency in collecting the heat in the panel. Other prior art solar heaters use parabolic dishes, lenses and mirrors to direct the sun rays against tubes which are typically painted black, and it should be clear that the heat exchanger of the present invention is also ideally suited for this type of solar heater. The present heat exchanger has a helical tube folded with a metallurgical seal to bond it to the outside of a hollow copper tube.

SUMMARY OF THE INVENTION

The present invention relates to a heat exchanger, a solar heater and solar heating panel in which the heat exchanger has an elongated hollow center core member which may be made of a material such as copper, steel, and other metals, a spiralling passageway made from a larger metal pipe spiralling around the hollow center core and using the center core to form one portion of the spiral passageway around the center core so that the spiralling passageway collects heat more efficiently in a fluid passing through the spiralling passageway. A solar panel is provided with a base support having a plurality of heat exchangers in accordance with the present invention mounted thereto with each heat exchanger connected to its adjacent heat exchanger member to form a continuous path through the solar heating panel from an input pipe to an output pipe through the base. The hollow center core may have electrical resistance heaters mounted therein so as to eliminate the necessity for an additional hot water heater.

BRIEF DESCRIPTION OF THE DRAWINGS

Other objects, features and advantages of the present invention will be apparent from the written description and the drawings, in which:

FIG. 1 is a perspective view of a solar water heating panel in accordance with the present invention;

FIG. 2 is a fragmentary section taken on the line 2—2 of FIG. 1;

FIG. 3 is a sectional view taken on the line 3—3 of FIG. 1; and

FIG. 4 is a sectional view taken on the line 4—4 of FIG. 1.

DESCRIPTION OF THE PREFERRED EMBODIMENT

Referring now to the drawings, FIG. 1 shows a solar heating panel 10 having a base support structure 11 having a floor 12 which may be made of copper painted or coated black and a pair of side walls 13 and end walls 14 and 15. The panel 10 has a plurality of elongated heat exchanger units 16 mounted therein to the floor 12 with metal straps 17 which may be attached with rivets 18. Each heat exchanger 16 is connected at one end with its adjacent heat exchanger by a pipe 20, each pipe being located at the opposite end from each other pipe 20 to form a squared-off serpentine path for a fluid entering an input 21 into one heat exchanger 16 at one side of the panel through the heat exchangers to an output 22 passing through the end wall 15 from the last heat exchanger unit 16. The solar panel 10 may be covered with a sheet of glass 23 or other transparent material and would typically be surrounded by an insulating material 24 shown in FIG. 4. Each heat exchanger unit 16 has a center core member 25 such as a rigid copper pipe material and has a spiralling passageway 26 wrapped around the core 25. The spiralling passageway 26 is made from a larger metal tube such as a copper tube formed in a process to form the spiralling tube having a spiralling groove 27 wrapping therearound in which the bottom 28 of the groove 27 has been forced against the outer wall 30 of the copper tube 25 with sufficient pressure to provide a bond 31 between the metal tubes. The outer surface of the spiralling passageway 26 is flat, thereby providing more surface area and providing better contact with the base plate 12. In one preferred embodiment of the present invention, resistance heating elements 32 are mounted within each center core tube 25. The heating element may have an outside diameter to fit snugly into the rigid copper pipe for heating efficiency. The heating elements 32 are connected by electrical conductors 33 to an electrical box 34 which may contain appropriate circuit breakers connected to the entrance panel of the building on which the solar panel 10 is mounted. FIG. 2 shows the outside spiralling passageway which has a rectangular cross-section shape to absorb heat from solar panel 12.

FIG. 3 shows a connection for the tubes 20 in which the tubes are connected into the spiralling passageway 26 and having electrical heating element 32 in tubes 25.

FIG. 4 shows an alternate embodiment in which the connecting tubes 20 pass only into the passageway 26 and does not have the electrical resistance elements 32 mounted therein. This embodiment does have a transparent cover 23, the base plate 12, side walls 13 and straps 17 holding the heat exchanger members 16 to the base plate 12.

Thus, in actual operation, the solar panel 10 can operate with a fluid such as water flowing into the input 21 and following the passageway 26 around each center core 25 passing into the next adjacent heat exchanger 16 through connecting pipe 20 and around the passageway 26 until it completes its circuit and out the output 22. If insufficient heat is being generated by solar rays impinging upon the blackened copper surface bottom 12, a thermostat can actuate the heating elements 32 in one embodiment to generate the needed amount of heat. An electrical conductor 28 connects into the water passageway in the heat exchanger 16 to detect the temperature of the water passing through the final heat exchanger to actuate the electrical line through a relay located in the electrical box 34.

The heat exchangers 16 and core pipe 25 may be made of copper or aluminum, or of other suitable conductive metal, while the outer pipe forming the passageway 26 may be made of a similar metal, and the floor 12 and straps 17 may be made out of a conductive metal to assist in conducting heat between the base 12 into the passageway pipes 26. The floor 12 would typically be coated flat black and the heat exchangers 16 may also have a black coating. The invention includes the electrical heating element within the heat exchanger and an electrical box and thermostat, so that the unit can replace the existing water heater of a building.

Accordingly, the present invention is not to be construed as limited to the forms shown, which are to be considered illustrative rather than restrictive.

I claim:

1. A solar heating panel comprising in combination:

a base support having a bottom member and a plurality of sides;

input and output means connected through said base support;

a plurality of heat exchanger members mounted to said base support member, each said heat exchanger member having an elongated hollow center core and a spiral passageway spiralling around said hollow center core with said hollow center core forming a portion of the spiral passageway wall and each heat exchanger member being connected to the next adjacent heat exchanger member spiral passageway to form a continuous path from one to the next heat exchanger member, and at least one said heat exchanger member being connected to the input means and at least one heat exchanger member being connected to the output means, whereby said spiralling passageways collect heat in a fluid passing therethrough from said input means to said output means when said solar heating panel is placed in sunlight;

each of a plurality of said heat exchanger members having an electric heating element mounted in the hollow center core thereof, which electric heating elements are thermostatically controlled, whereby said electric heating elements can boost the heat in fluid passing through said solar panel when said electric heating elements are actuated; and an electrical circuit breaker box mounted to said solar heating panel and connected to said electrical heating elements, said electrical circuit box being connected to a thermostat in one said heat exchange member for actuating each of said electric heating elements in each heat exchanger member.

2. A solar heating panel in accordance with claim 1, in which each heat exchanger member is connected to the next adjacent heat exchanger member by a pipe connecting one heat exchanger's spiral passageway with the other heat exchanger's spiral passageway.

3. A solar heating panel in accordance with claim 1, in which said heat exchanger member spiral passageway is formed on said elongated hollow center core with a spiralling groove forming a watertight seal against said hollow center core exterior surface.

4. A solar heating panel in accordance with claim 3, in which said solar heating panel base support bottom member is a copper plate coated black and said heat exchanger members are strapped to said copper plate and said panel is covered with a transparent sheet over said heat exchanger members and base support bottom member.

5. The solar heating panel in accordance with claim 4, in which said heat exchanger member hollow center core and spiral passageway are formed of copper pipe with a rectangular spiral shape.

* * * * *